United States Patent
Tsuji

[11] Patent Number: 5,040,881
[45] Date of Patent: Aug. 20, 1991

[54] IMAGE STABILIZATION LENS SYSTEM

[75] Inventor: Sadahiko Tsuji, Kanagawa, Japan

[73] Assignee: Canon Kabushiki Kaisha, Tokyo, Japan

[21] Appl. No.: 346,512

[22] Filed: May 2, 1989

[30] Foreign Application Priority Data

May 12, 1988 [JP] Japan .................... 63-115302
May 12, 1988 [JP] Japan .................... 63-115303
May 12, 1988 [JP] Japan .................... 63-115304

[51] Int. Cl.$^5$ .................... G02B 15/14; G02B 27/64
[52] U.S. Cl. .................... 359/557; 359/813; 359/676
[58] Field of Search ............ 350/423, 463, 500, 247

[56] References Cited

U.S. PATENT DOCUMENTS

| 3,560,080 | 2/1971 | Wilczynski et al. | 350/247 |
| 4,387,970 | 7/1983 | Brueggemann | 350/463 |
| 4,832,471 | 5/1989 | Hamano | 350/423 |
| 4,840,468 | 6/1989 | Tanaka | 350/423 |
| 4,844,602 | 7/1989 | Kitagishi et al. | 350/500 |

Primary Examiner—Bruce Y. Arnold
Assistant Examiner—Rebecca D. Gass
Attorney, Agent, or Firm—Fitzpatrick, Cella, Harper & Scinto

[57] ABSTRACT

A zoom lens comprising a front lens group including a lens unit for decentering relative to an optical axis to stabilize an image at the focal plane and a rear lens group including lens units movable along the optical axis for zooming on the image side of the front lens group.

16 Claims, 5 Drawing Sheets

IMAGE STABILIZATION LENS SYSTEM

BACKGROUND OF THE INVENTION

1. Field of the Invention

This invention relates to optical systems with means for stabilizing the movement of an image that occurs against unexpected shakes.

2. Description of the Related Art

When pictures are being taken from on a moving vehicle such as a running car or a flying aircraft, vibrations propagate to the photographic system so that the blurring will appear in the taken photographs.

Methods of preventing the image from blurring in taking pictures, or image stabilizing optical systems have been proposed in, for example, Japanese Laid-Open Patent Applications Nos. Sho 50-80147 and 61-223819 and Japanese Patent Publication No. Sho 56-21133.

Japanese Laid-Open Patent Application No. Sho 50-80147 discloses a zoom lens having two afocal systems for varying the image magnification, wherein letting the angular magnification of the first system be denoted by $M_1$ and the angular magnification of the second system by $M_2$, the relationship: $M_1 = 1 - 1/M_2$ is maintained when the image magnification is varied, while the second system is held in fixed spatial alignment with the original line of sight to compensate for the movement of the image. Thus, the image is stabilized.

Japanese Patent Publication No. Sho 56-21133 employs means for detecting the vibratory state of the optical instrument, whereby the direction in which either the lens unit behind the zoom section, or an optical member such as mirror is to move is controlled in accordance with its output signal so that the accidental displacement of the image due to the shake is canceled, thus achieving stabilization of the image.

Japanese Laid-Open Patent Application No. Sho 61-223819 provides for the photographic system with a refraction type variable vertex-angle prism in the frontmost position, wherein variation of the vertex angle of the prism is controlled in accordance with displacement of the photographic system to deflect the image, thus achieving stabilization of the image.

Besides these, Japanese Patent Publications Nos. 56-34847 and 57-7414 disclose photographic systems of which one constituent optical member is arranged to be held in fixed spatial alignment with the line of sight against shakes, wherein upon angular deviation of the housing of the system, this optical member generates a prism. By utilizing this effect, the image of an object in the line of sight is deflected to such a direction that it remains stationary at the focal plane. Also, U.S. Pat. No. 2,959,088 discloses an image stabilizing optical system for the device concerning telescopes. Further there is U.S. Pat. No. 3,378,326.

It is also known to utilize the acceleration sensor in detecting occurrence of shakes of the photographic system. Responsive to a signal obtained at this time, a lens group constituting part of the photographic system is made to vibrate in a plane perpendicular to the optical axis so that a stationary image is obtained at the focal plane. As this example there are U.S. patent applications Ser. Nos. 261,231 filed on Oct. 24, 1988; 156,930 field on Feb. 17, 1988; 116,541 filed on Nov. 4, 1987; and 116,668 filed on Nov. 4, 1987.

By the way, for the case of adding the capability of image stabilization to the zoom lens system, a necessity usually arises that, depending on the varied focal length of the entire system, an additional compensation be made to the image stabilizing optical member, as, for example, Japanese Patent Publication No. 56-21133 suggests. Also, as Japanese Laid-Open Patent Application No. Sho 50-86147 suggests, some limitations must be set forth.

In general, to facilitate a minimization of the stress in the operating mechanism for decentering one lens group of the photographic system to compensate for the image movement to obtain the stationary image at the focal plane, the photographic system is required to be of the form that the relationship between the amount of deflection of the image and the amount of decentering movement of that lens group is simplified.

SUMMARY OF THE INVENTION

An object of the invention is to provide a zoom lens in which the movement of the image that is caused by unexpected shakes is compensated for by decentering a lens component constituting part of the entire system relative to an optical axis.

And, a second object is to provide an image stabilizing method which enables the mechanism for stabilizing the image the zoom lens forms to be simplified in structure.

DETAILED DESCRIPTION OF THE PREFERRED EMBODIMENTS

Figure 1:
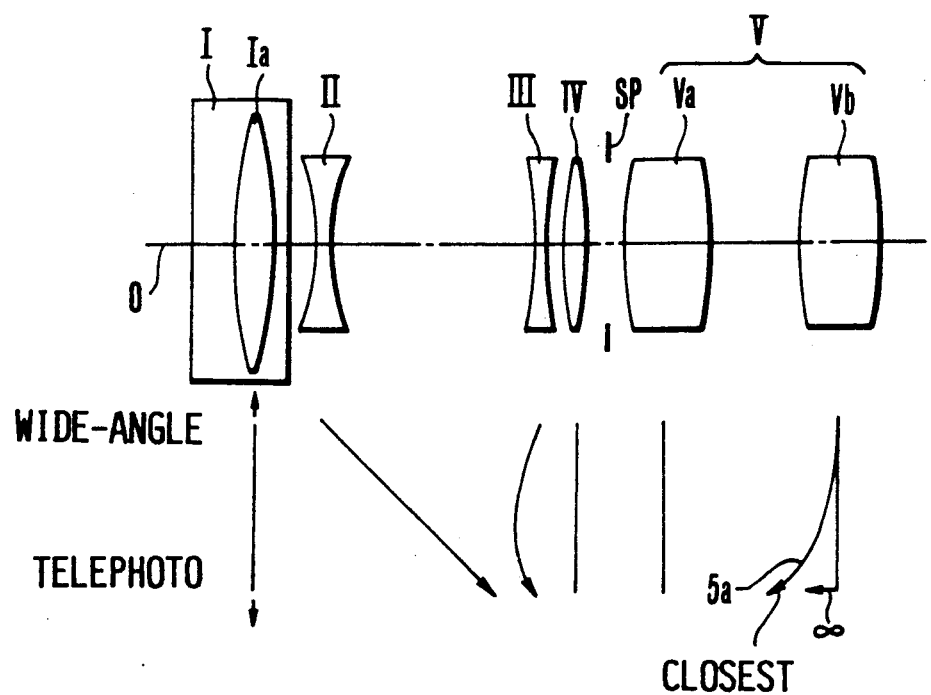
FIGS. 1 to 5 are schematic diagrams of first to fifth embodiments of stabilized zoom lenses according to the invention.

In FIG. 1 there is shown one embodiment of the invention. The optical system comprises, from front to rear, a first lens group I which is stationary during zooming, including a lens component Ia arranged to move in a plane perpendicular to an optical axis when stabilizing the image, a second lens component II for varying the image magnification, a third lens component III for compensating for the image shift resulting from the variation of the image magnification, the second lens component II and the third lens component III constituting a zoom section and being moved, for example, along loci shown by arrow-headed curves when zooming from the wide-angle end to the telephoto end, a fourth lens component IV for making afocal the light beam emerging from the third lens component III, and a fifth lens component V which is stationary during zooming, consisting of a fixed lens component Va and a focusing lens component Vb. SP is a stop in a fixed axial position. Incidentally, all the lens components each are constructed with a plurality of lenses.

In general, the varifocal optical systems have a principle that when it tilts to an angle $\theta$ with respect to the original line of sight, the image at the focal plane is deflected from the original position by a distance $\Delta Y$ given by the following expression:

$$\Delta Y = f \cdot \tan \theta$$

where f is the focal length of the entire system. Therefore, to compensate for this distance of deflection by using that lens group which lies behind the zoom section, it becomes necessary to control the compensation in accordance with the focal length f.

Meanwhile, in the varifocal optical system of the type shown in FIG. 1, the first lens component which is stationary during zooming, because of its being arranged in front of the zoom section comprising the second lens component and the third lens component, gets to have a nature that the sensitivity it gives the image deflection to a decentering is proportional to the focal length.

So, relying on this nature, the present embodiment is to make use of at least part of the first lens component, say, a lens component Ia, as the image stabilizing lens, whereby the lens component Ia is compensated in the plane substantially perpendicular to the optical axis by the same amount of movement as the angular deviation of the housing of the varifocal optical system from the original line of sight. In such a manner, an image stabilizing effect is obtained.

Again, in the present embodiment, the focusing function is given to part of the fifth lens component, namely, a lens component Vb by moving it along the optical axis as indicated by an arrow 5a. From the foregoing, it will be appreciated that in the present embodiment, provision for the image stabilizing function is made in the first lens component, while provision for the focusing function is made behind the zoom section or at the fifth lens component. The use of such an allotment of different functions to different lens components leads to avoiding an increase in the complexity of structure of the mechanical mounting for the optical system, while still permitting achievement of an advantageously compensated varifocal optical system against the deflection of the image due to shakes or the like.

The present embodiment is next explained in connection with equations for the case of using the lens component Ia in stabilizing the image. Now letting the image magnification of the i-th lens component be denoted by $\beta_i$, the focal length of the i-th lens component by $f_i$, and the focal length of the entire system by f, the amount of movement of the image in the focal plane to a component of movement of the i-th lens component in a plane perpendicular to the optical axis, in other words, the sensitivity $S_{pi}$ to the parallel decentering in terms of the product of the image magnifications of the (i+1)th lens component to the last k-th lens component, $\beta_{(i+1)\sim k'}$ is given by the following expression:

$$S_{pi} = (1 - \beta_i) \cdot \beta_{(i+1)\sim k}$$

Meanwhile, $$f = f_1 \cdot \beta_{2\sim k}$$

Further, for an infinitely distant object, $\beta_i = 0$. Hence, $$S_{p1} = \beta_{2\sim k}$$

From this, the amount of deflection $\Delta Y$ of the image, or $\Delta Y = f \cdot \tan \theta$ is rewritten as follows:

$$\Delta Y = f_1 \cdot \beta_{2\sim k} \cdot \tan \theta$$

To compensate for this amount of deflection of the image, the lens component Ia in the first lens unit is required to move in the plane perpendicular to the optical axis by a distance, $\delta$ given by the following expression:

$$\delta = -\Delta Y / S_{p1} = -f_1 \cdot \tan \theta$$

It is, therefore, in the present embodiment that regardless of any value of the focal length f in the zooming range of the varifocal optical system, only adjustment of the distance the lens component Ia is decentered in the plane perpendicular to the optical axis to a value $\delta$ suffices for the possibility of complete stabilization of the image.

In the present embodiment, since $\tan \theta \approx \theta$ in a range of small tilt angles $\theta$, for a simple case, even if the lens component Ia is tilted in the first lens component at the focal point of the lens component Ia to an angle $-\theta$ with the optical axis, the deflection of the image can be compensated for. At this time, despite of some orientation of the housing of the lens system, no deviation of the image point occurs at all.

In the present embodiment, all the components of the first lens group may otherwise be moved at once in a plane perpendicular to the optical axis. Even in this case, the deflection of the image can be likewise compensated, provided that the amount of compensation and the position of the pivot point for tilting are properly set depending on the sensitivity of the first lens group I. As the operating mechanism for the image stabilizing lens system of this kind, mention may be made of that in U.S. Pat. No. 3,378,326, or the mechanism having a balance weight on the opposite side of the pivot point for tilting to the lens component Ia at the confronting position thereto, as disclosed in U.S. Pat. No. 2,959,088.

The principle of the varifocal optical system according to the present embodiment is applicable to any other zoom types, provided that the zoom section is located after the first lens group.

In the present embodiment, it is preferred that the focusing movement of the lens component Vb in the fifth lens component V is varied as the focal length of the entire system varies. For this purpose, a position sensor may be used in detecting the position of the second lens component II of the varifocal optical system to determine the distance by which the lens component Vb is to move forward. Another method is by using the automatic focus detecting device which utilizes the video signals.

Figure 2:
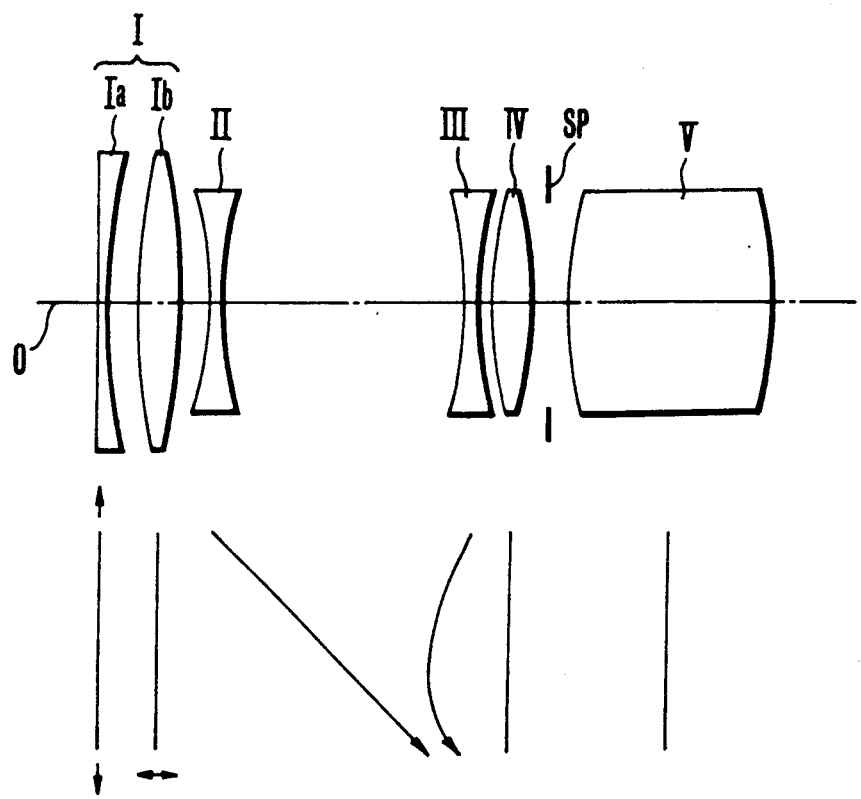

FIG. 2 is a schematic diagram of a second embodiment of the optical system according to the invention. Though the first embodiment has been illustrated with an example of the focusing lens provided in the fifth lens component V, the present invention is not confined to this. The focusing provision may be made within the first lens group. In the following, an embodiment employing this form of the invention is described. The optical system comprises, from front to rear, a first lens group I which is stationary during zooming, including a second lens component Ia movable for decentering in a plane perpendicular to an optical axis O to stabilize an image at a focal plane, and a first lens component Ib axially movable for focusing, a second lens component II for varying the image magnification, a third lens component III for compensating for the image shift resulting from the variation of the focal length, the second lens component II and the third lens component III constituting a zoom section, and being moved, for example, as indicated by arrows, when zooming from the wide-angle end to the telephoto end, a fourth lens component IV for making afocal the light beam emerging from the third lens component III, and an image forming fifth lens component V. SP represents a stop in a fixed axial position.

In the present embodiment, a lens component Iaa constituting part of the lens component Ia in the first lens unit I may be made to move in a plane perpendicular to the optical axis O, so that the deflection of the image can be compensated for likewise as has been described before. In this case, too, depending on the sensitivity of the lens unit Iaa, the amount of compensation and the position of the pivot point for tilting should be properly set.

It should be noted that in the present embodiment, the use of the lens component Ib of the first lens group I in focusing leads to the necessity that the image magnification $\beta_{1b}$ for an infinitely distant object of the lens component 1b satisfies the condition: $|\beta_{1b}| \neq 1$, and that when $|\beta_{1b}| > 1$, the lens component Ib is moved toward the image side as the object distance decreases, while when $|\beta_{1b}| < 1$, it is moved toward the object side as the object distance decreases.

Figure 3:
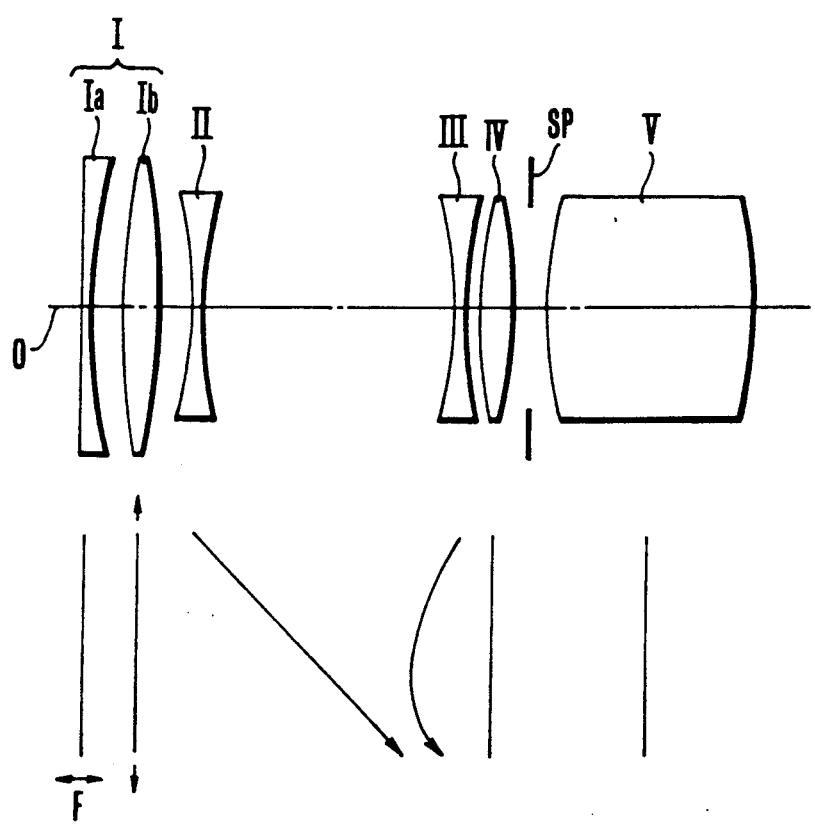

FIG. 3 is a schematic diagram of a third embodiment of the optical system according to the invention. The optical system, comprises, from front to rear, a first lens group I which is stationary during zooming, including, as will be described later, a first lens component unit Ia axially movable for focusing, and a lens second component Ib movable in a plane perpendicular to an optical axis O for stabilizing an image at a focal plane, a second lens component II for varying the focal length of the entire system, a third lens component III for compensating for the image shift resulting from the variation of the image magnification, the second lens component II and the third lens component III constituting a zoom section, and being moved, for example, as indicated by arrows, when zooming from the wide-angle end to the telephoto end, a fourth lens component IV for making afocal the light beam emerging from the third lens component III, and a fifth lens component V for forming an image, with a stop SP between the fourth and fifth lens components IV and V.

In general, in the varifocal optical system, the amount of deflection $\Delta Y$ of the image at the focal plane from a predetermined position against a certain amount of deviation (angle $\theta$) of the housing of the varifocal optical system from the line of sight in terms of the focal length f is expressed as:

$$\Delta Y = f \cdot \tan \theta$$

In this principle, therefore, to compensate the amount of deflection of the image by using that lens component which lies behind the zoom section, the amount of compensation must be controlled in accordance with the focal length f.

Meanwhile, in the varifocal optical system of the type shown in FIG. 3, the first lens component having the focusing function and arranged in front of the zoom section (II, III) to remain stationary during zooming gets to have a nature that the sensitivity of the image at the focal plane to the parallel decentering becomes proportional to the focal length.

So, in the present embodiment, by utilizing this nature, an image stabilizing effect is obtained in such a way that the first lens group is divided into the lens component Ia and the lens component Ib, and that the lens component Ib is given the same amount of compensation in the plane perpendicular to the optical axis as the angular deviation of the housing of the varifocal optical system due to shakes.

Also, by axially moving the lens component Ia, the focusing function is given thereto. Thereby, while averting the increase in the complexity of the operating mechanism which would otherwise result when the first lens group I as a whole has both of the image stabilizing function and the focusing function, a varifocal optical system advantageously compensated for the deflection of the image that accompanies with shakes or the like is achieved.

The present embodiment is next explained in connection with equations derived in the case of using the lens component Ib in stabilizing the image. Now letting the image magnification of the i-th lens component be denoted by $\beta_i$, the focal length of the i-th lens component by $f_i$, the focal length of the entire system by f, for a component of movement of the i-th lens component in a plane perpendicular to the optical axis, the amount of movement of the image at the focal plane, or the sensitivity $S_{pi}$ of the image to the parallel decentering in terms of the product of the image magnifications of the (i+1)th lens component until the last k-th lens component, denoted by $\beta_{i+1 \sim k}$ becomes:

$$S_{pi} = (1 - \beta_i) \cdot \beta_{i+1 \sim k}$$

Meanwhile, $$f = f_1 \cdot \beta_{2 \sim k}$$

Further, for an infinitely distant object, $\beta_i = 0$. Hence, $$\begin{aligned} S_{P2} &= (1 - \beta_2) \cdot \beta_{3 \sim k} \\ &= \beta_{3 \sim k} - \beta_{2 \sim k} \\ &= \frac{f}{f_1} \left( \frac{1}{\beta_2} - 1 \right) \end{aligned}$$

Meanwhile, since the equation for the amount of deflection $\Delta Y$ of the image is $\Delta Y = f \cdot \tan \theta$, the required amount of movement, $\delta$, for compensating for this amount of deflection of the image, of the lens component Ib in the first lens component I is given by the expression below:

$$\begin{aligned} \delta &= -\Delta Y / S_{p2} \\ &= -f_1 \cdot \tan \theta / \left( \frac{1}{\beta_2} - 1 \right) \end{aligned}$$

In the present embodiment, therefore, by moving the lens component Ib in the plane perpendicular to the optical axis by the distance $\delta$ from the optical axis regardless of any value of the focal length of the zooming position of the varifocal optical system, the deflection of the image can be compensated for.

The present embodiment may be modified to a simpler form that since $\tan \theta \approx \theta$ in a range of small angles $\theta$, the lens component Ib in the first lens group I is tilted to an angle of $-\theta$ in a sphere whose radius is $1/((1/\beta_2) - 1)$ with the center on the optical axis. Even in this case, the deflection of the image can be compensated for. Though such an orientation of the lens occurs to some extent, the image point is not caused to deviate.

Another example of modification of the present embodiment is that of the members of the lens component Ib of the first lens group I, the lens unit Iaa is moved in a plane perpendicular to the optical axis to compensate for the deflection of the image. In this case, depending on the sensitivity of the lens unit Iaa, the amount of compensation and the position of the pivot point for tilting should be properly set.

The principle of the varifocal optical system according to the present embodiment is applicable to any other zoom types, provided that the zoom section lies in rear of the first lens group.

It should be noted in connection with the present embodiment that, in a case where focusing is performed by the lens component Ia in the lens group I, the image magnification $\beta_{1a}$ for an infinitely distant object of the lens unit Ia is set to a value satisfying the condition: $|\beta_{1a}| \neq 1$. when $|\beta_{1a}| > 1$, the focusing lens Ia is moved rearward as the object distance decreases. When $|\beta_{1a}| < 1$, it is moved forward as the object distance decreases.

Figure 4:
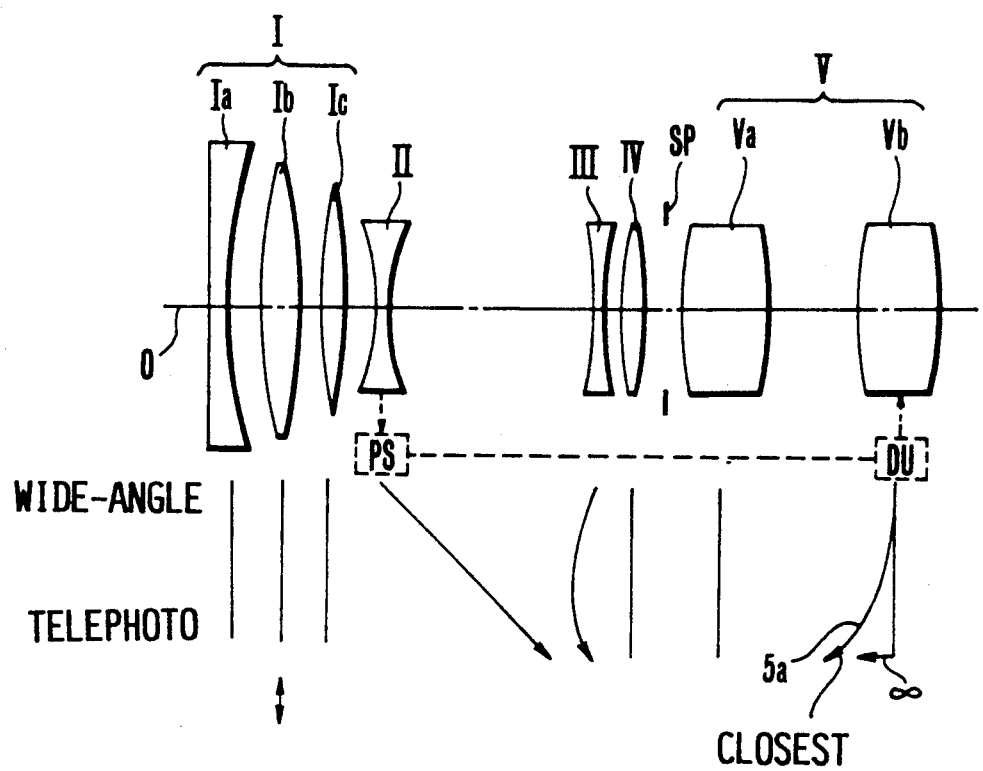

FIG. 4 shows a fourth embodiment of the invention. A front lens group I that precedes the zoom section (II, III) is constructed with, from three lens components having negative, positive and positive refractive powers in this order from the front, that is, a first lens component Ia, a middle lens unit Ib and a rear lens unit Ic. To stabilize the image at the focal plane, the middle lens component Ib is spatially held as it tilts about a predetermined point on the optical axis O.

Also, focusing is performed by axially moving a lens unit Vb constituting part of a fifth lens component V. For this purpose, similarly to the first embodiment, a position sensor PS is used to detect the position of the lens unit for varying the image magnification to determined the focal length of the zoom lens. Depending on this focal length information, the motion locus for the focusing lens unit Vb is determined. And, by a driving unit DU, the lens unit Vb is moved.

Figure 5:
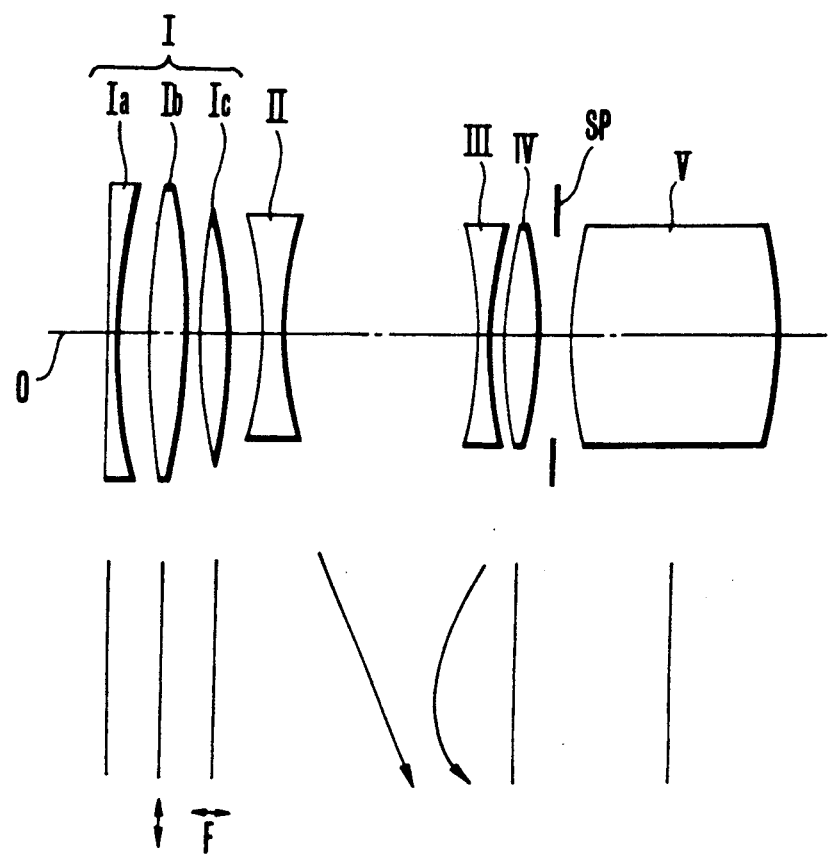

FIG. 5 is yet another embodiment of the invention. A front lens group that precedes the zoom section (II, III) is constructed with three lens components having negative, positive and positive refractive powers in this order from the front, that is, a front lens component Ia, a middle lens component Ib and a rear lens component Ic. To stabilize the image, the middle lens unit Ib is spatially held, as it tilts about a predetermined point on the optical axis O. And, focusing is performed by axially moving the rear lens component Ic.

As has been described above, according to the present invention, in the vertical optical systems including a front lens group having the image stabilizing function and a lens group for varying he image magnification, by decentering a lens component constituting part of the first lens group in regard to an optical axis of the zoom lens, the amount of compensation can be made the same as the angular deviation of the lens housing due to shakes or the like, regardless of the focal length of the varifocal optical system, thereby giving an advantage that, while avoiding an unduly large increase in the complexity of structure of the operating mechanism for the first lens group, the image stabilizing capability of quick and easy compensation can be imparted into the varifocal optical system.

What is claimed is:

1. A varifocal optical system having an optical axis, comprising:
   a front lens group including a first lens component and a second lens component capable of decentering relative to said optical axis to stabilize an image; and
   a rear lens group for varying an image magnification positioned on the image side of said front lens group.

2. A varifocal optical system according to claim 1, wherein said rear lens group includes a lens component capable of moving along the optical axis for zooming.

3. A varifocal optical system according to claim 1 or 2, wherein said first lens component has a negative refractive power, and wherein said second lens component has a positive refractive power.

4. A varifocal optical system according to claim 3, wherein focusing is performed by moving said first lens component along the optical axis.

5. A varifocal optical system according to claim 3, wherein focusing is performed by moving a lens components constituting part of said rear lens group along the optical axis.

6. A varifocal optical system according to claim 1, wherein said second lens component is positioned on the object side of said first lens component.

7. A varifocal optical system according to claim 1, wherein said first lens component is positioned on the object side of said second lens component.

8. A zoom lens having an optical axis, comprising:
   a front lens group including a first lens component and a second lens component capable of decentering relative to the optical axis to stabilize an image; and
   a rear lens group positioned on the image side of said front lens group and including a lens component capable of moving along the optical axis for zooming.

9. A zoom lens according to claim 8, wherein said first lens component has a negative refractive power, and wherein said second lens component has a positive refractive power.

10. A zoom lens according to claim 9, wherein said front lens group further including a third lens component capable of moving along the optical axis for focusing on the image side of said second lens component.

11. A zoom lens according to claim 9, wherein said second lens component is positioned on the image side of said first lens component and is tilted about a predetermined point on the optical axis.

12. A zoom lens according to claim 8, wherein said rear lens group includes a lens component capable of moving along the optical axis for focusing.

13. A zoom lens having an optical axis, comprising:
   a front lens group including a lens component for decentering relative to the optical axis to stabilize an image, and
   a rear lens group including a plurality of lens components movable along the optical axis for zooming on the image side of the front lens group.

14. A zoom lens according to claim 13, wherein said front lens group further includes a negative lens component on an object side of said lens component, and said lens component has a positive refractive power.

15. A zoom lens according to claim 14, wherein said front lens group further includes a positive lens component capable of moving along the optical axis for focusing on an image side of said lens component.

16. A zoom lens according to claim 14, wherein said rear lens group includes a focusing lens component capable of moving along the optical axis for focusing.

* * * * *

UNITED STATES PATENT AND TRADEMARK OFFICE
CERTIFICATE OF CORRECTION

PATENT NO. :   5,040,881
DATED      :   August 20, 1991
INVENTOR(S) :  SAKAHIKO TSUJI It is certified that error appears in the above-jdentified patent and that said Letters Patent is hereby corrected as shown below:

Column 1
    Line 66, "field" should read --filed--.

Column 5
    Line 6, "lens unit I" should read --lens group I--.
    Line 24, "system," should read --system--.
    Line 26, "unit Ia" should read --Ia--.

Column 6
    Line 33, "ßi=0." should read --ßi=0.--
    Line 46, "first lens component I" should read --first lens group I--.
    Line 64, "$1/(1/\beta_2)-1)$" should read --$1/((1/\beta_2)-1)$--.

Column 7
    Line 17 "lens unit Ia" should read --lens component Ia--.
    Line 18. "when" should read --When--.

UNITED STATES PATENT AND TRADEMARK OFFICE
CERTIFICATE OF CORRECTION

PATENT NO. : 5,040,881
DATED : August 20, 1991
INVENTOR(S) : SADAHIKO TSUJI

It is certified that error appears in the above-identified patent and that said Letters Patent is hereby corrected as shown below:

Column 7:

Line 26, "middle lens unit Ib" should read --middle lens component Ib-- and "rear lens unit Ic." should read --rear lens component Ic.--

Line 50, "vertical" should read --varifocal-- and "systems" should read --system--.

Line 52, "he" should read --the--.

Column 8

Line 18, "nents" should read --nent--.

Line 40, "including" should read --includes--.

Line 53, "image," should read --image;--.

Signed and Sealed this

Twentieth Day of April, 1993

Attest:

MICHAEL K. KIRK

Attesting Officer     Acting Commissioner of Patents and Trademarks